(12) United States Patent
Metral (10) Patent No.: US 8,925,402 B2
(45) Date of Patent: Jan. 6, 2015

(54) OUTPUT SHAFT FOR STARTING DEVICE

(75) Inventor: Jean-Sebastien Metral, La Verpilliere (FR)

(73) Assignee: Valeo Equipements Electriques Moteur, Creteil (FR)

(*) Notice: Subject to any disclaimer, the term of this patent is extended or adjusted under 35 U.S.C. 154(b) by 1062 days.

(21) Appl. No.: 12/190,869

(22) Filed: Aug. 13, 2008

(65) Prior Publication Data

US 2009/0071288 A1      Mar. 19, 2009

(30) Foreign Application Priority Data

Sep. 18, 2007   (FR) ...................................... 07 57649

(51) Int. Cl.
| | | |
|---|---|---|
| F02N 15/06 | (2006.01) | |
| B23P 11/00 | (2006.01) | |
| F02N 15/02 | (2006.01) | |
| F16D 1/072 | (2006.01) | |
| F16D 11/10 | (2006.01) | |
| F16D 41/00 | (2006.01) | |
| F16D 47/02 | (2006.01) | |
| F02N 15/00 | (2006.01) | |

(52) U.S. Cl.
CPC ............ *F02N 15/023* (2013.01); *F02N 15/067* (2013.01); *F16D 1/072* (2013.01); *F16D 11/10* (2013.01); *F16D 41/00* (2013.01); *F16D 47/02* (2013.01); *F02N 15/00* (2013.01)
USPC ............... 74/7 R; 74/7 C; 123/185.6; 290/46; 310/263; 403/282; 29/598

(58) Field of Classification Search
USPC ...... 74/7 C, 7 R, 10.45, 567, 431; 123/185.6; 290/48; 310/263, 264; 403/282, 279; 29/598
See application file for complete search history.

(56) References Cited

U.S. PATENT DOCUMENTS

| | | | | |
|---|---|---|---|---|
| 3,513,533 | A | * | 5/1970 | Nauta .............................. 29/437 |
| 4,339,873 | A | * | 7/1982 | Kanamaru et al. .............. 29/598 |
| 4,377,762 | A | * | 3/1983 | Tatsumi et al. ................ 310/263 |
| 4,574,648 | A | | 3/1986 | Debello |
| 4,886,392 | A | * | 12/1989 | Iio ................................. 403/282 |
| 4,900,945 | A | * | 2/1990 | Isozumi et al. .................. 290/48 |

(Continued)

FOREIGN PATENT DOCUMENTS

| | | | |
|---|---|---|---|
| DE | 197 06 615 A1 | 9/1997 | |
| DE | 19706615 | * 9/1997 | .............. F02N 11/02 |

(Continued)

OTHER PUBLICATIONS

Derwent—1997-432698, English Abstract of JP 9-195903.*

(Continued)

*Primary Examiner* — Vinh Luong
(74) *Attorney, Agent, or Firm* — Berenato & White, LLC (57) ABSTRACT

An output shaft (14) of a starting device (1) is provided to equip a motor vehicle. This output shaft (14) comprises a mounting support (16), a driving element (17) on the mounting support (16) intended to transmit a rotation movement to a thermal engine, and a track (15) on the mounting support (16) intended to transmit a rotation movement to the mounting support (16), this track (15) being driven by a freewheel of a starter-head assembly of the starting device. The track (15) is attached and secured to the mounting support (16).

13 Claims, 4 Drawing Sheets

(56) References Cited

U.S. PATENT DOCUMENTS

| | | | |
|---|---|---|---|
| 5,105,670 A * | 4/1992 | Isozumi et al. | 74/6 |
| 6,237,432 B1 * | 5/2001 | Vilou | 74/7 C |
| 6,247,439 B1 * | 6/2001 | Gokan et al. | 123/185.6 |
| 6,397,469 B2 * | 6/2002 | Parker | 29/897.3 |
| 6,633,099 B2 * | 10/2003 | Fulton et al. | 310/75 R |
| 6,883,997 B1 * | 4/2005 | Ruschmann et al. | 403/279 |
| 2003/0020362 A1 * | 1/2003 | Droll et al. | 310/264 |
| 2003/0037631 A1 * | 2/2003 | Hedman | 74/431 |
| 2005/0172755 A1 * | 8/2005 | Burgler | 74/567 |
| 2005/0229734 A1 | 10/2005 | Vogt et al. | |
| 2006/0075838 A1 * | 4/2006 | Hacker | 74/10.45 |
| 2006/0144175 A1 * | 7/2006 | Nawa et al. | 74/7 C |
| 2006/0201266 A1 | 9/2006 | Kajino et al. | |
| 2011/0076091 A1 * | 3/2011 | Jenks | 403/24 |
| 2011/0303255 A1 * | 12/2011 | DeLap et al. | 135/114 |
| 2011/0318094 A1 * | 12/2011 | Hensley | 403/217 |

FOREIGN PATENT DOCUMENTS

| | | | | |
|---|---|---|---|---|
| FR | 2 066 173 | | 8/1971 | |
| FR | 2 739 661 | * | 4/1997 | F02N 15/00 |
| FR | 2 816 011 | | 5/2002 | |
| FR | 2 816 126 | | 5/2002 | |
| FR | 2 929 462 | * | 10/2009 | H02K 7/118 |
| GB | 2 386 850 | | 10/2003 | |
| JP | 9-195903 | * | 7/1997 | F02N 15/02 |
| WO | WO 02/037647 A1 | * | 5/2002 | H02K 7/116 |
| WO | WO 02/061272 A1 | * | 8/2002 | F02N 15/06 |

OTHER PUBLICATIONS

English Abstract of DE 10706615.*
English Abstract of FR 2739661.*
Machine Translation of WO 02/037647, Roumanet et al., May 10, 2002.*
Machine Translation of DE 197 06 615 A1, Quentric, Sep. 11, 1997.*

* cited by examiner

OUTPUT SHAFT FOR STARTING DEVICE

This application is a U.S. Utility Patent Application based on French Patent Application No. 07/57649 filed Sep. 18, 2007, and is hereby incorporated by reference in its entirety.

FILED OF THE INVENTION

The present invention concerns an output shaft for a starting device for an internal combustion engine, in particular for a motor vehicle.

BACKGROUND OF THE INVENTION

Normally, when an internal combustion engine, or thermal engine, is started, the electrical starting device passes through three successive phases, namely a driving phase, a freewheeling phase during which the thermal engine turns independently, and a stop phase.

In order to provide the driving and freewheeling phases, there is known in the prior art a starting device comprising an electric motor, an output shaft able to transmit a rotation movement to the thermal engine and a starter-head assembly comprising in particular a freewheel, for example with a roller.

During the driving phase, the electric motor drives the starter-head assembly, which, by virtue of a locking of the freewheel on the output shaft, transmits a rotation movement to the output shaft. The locking of the freewheel on the output shaft causes high contact forces applied locally to this output shaft.

It is also known how to produce a single-piece output shaft comprising a track to which the high contact forces are applied, a support and a pinion intended to drive the thermal engine. The elements of the output shaft may have the same hardness.

However, different elements of the output shaft do not need to have equal hardnesses. In particular, the support does not need to have a hardness equal to the hardness of the track and to the hardness of the pinion.

In this case, in order to satisfy the conditions of local hardness on the output shaft, the output shaft may under go complex heat treatments expensive to implement, for example hardening applied locally to this output shaft.

There therefore exists a need to adapt the hardnesses of the different elements of the output shaft according to their use without having recourse to complex and expensive local heat treatments of the type described above.

SUMMARY OF THE INVENTION

The invention aims in particular to propose a novel output shaft having elements having different and adapted hardnesses, and to simplify the assembly of a starting device comprising this output shaft.

The invention provides an output shaft of a starting device able to equip a motor vehicle, comprising:
  a mounting support,
  a driving element on the mounting support intended to transmit a rotation movement to a thermal engine, and
  a track on the mounting support intended to transmit a rotation movement to the mounting support, this track being driven by a freewheel of a starter-head assembly of the starting device.

According to the invention, the track is attached and secured to the mounting support. "Attached" means what has been added to something. In this case, the track, which is an independent piece, is added integrally, in particular in translation and rotation, to the mounting support.

The invention makes it possible in particular to have an output shaft comprising at least two elements including an attached track with high hardness. By virtue of the invention, the complex and expensive heat treatments on the output shaft are eliminated. This is because the attached track may have a high hardness before being mounted on the output shaft. In addition, the choice of materials making up the elements of the output shaft may be optimised, in particular according to their hardness. This feature reduces the cost of the output shaft. In addition also, the invention allows a saving in material on the mounting support.

According to the invention, the attached track and the mounting support can have means for assembling the attached track on the mounting support.

In an example of implementation of the invention, the mounting support comprises, at a rear end, a rear portion able to be deformed, and the attached track comprises a material reception indentation able to receive the deformed rear portion. The reception indentation can be produced by stamping, which has the advantage of being inexpensive.

In this example implementation of the invention, the means for assembling the attached track on the mounting support are formed by the material reception indentation, and the means of the mounting support are formed by the rear portion at the rear end of the mounting support.

Preferably, the rear portion at the rear end of the mounting support is able to be deformed by crimping. The crimping operation offers the advantage of being relatively inexpensive and well controlled.

In another example of implementation of the invention, the attached track comprises a portion fluted on an internal periphery, and the mounting support comprises, at a rear end, on an external periphery, a fluted rear portion able to cooperate with the fluted portion of the attached track, and a holding element intended to translationally lock the attached track on the mounting support.

In this other example of implementation of the invention, the means for assembling the attached track on the mounting support are formed by the fluted portion, and the mounting support means are formed by the fluted rear portion at the rear end of the mounting support and by a holding element.

Advantageously the driving element is attached firmly to the mounting support. The definition of the term "attached" for the driving element is the same as for the definition indicated previously concerning the track. In this embodiment, the output shaft comprises three distinct elements. In this case, the optimum in the choice of the materials making up the elements of the output shaft can be found.

For example, the attached track can have a higher hardness than the mounting support and the driving element.

In addition, the characteristic of having an attached driving element and an attached track allows an even greater saving in material on the mounting support. This is because this characteristic has the advantage of eliminating operations of machining the output shaft.

In accordance with the invention, the attached driving element and the mounting support can comprise means for assembling the attached driving element on the mounting support.

The mounting support can comprise, at a front end, a front portion able to be deformed and the attached driving element can comprise a material reception indentation able to receive the deformed front portion. The reception indentation can be produced by stamping, which has the advantage of being inexpensive.

In this case, the means for assembling the attached driving element on the mounting support are formed by the material reception indentation, and the mounting support means are formed by a front portion at a front end of the mounting support.

Preferably, the front portion at the front end of the mounting support is able to be deformed by crimping. The crimping operation offers the advantage of being relatively inexpensive and well controlled.

In a variant, the attached driving element comprises a portion fluted on an internal periphery, and the mounting support comprises, at a front end, on an external periphery, a fluted front portion able to cooperate with the fluted portion of the attached driving element, and a holding element intended to translationally lock the attached driving element on the mounting support.

In this case, the means for assembling the attached driving element on the mounting support are formed by a fluted portion, and the mounting support means are formed by a fluted front portion at the front end of the mounting support.

Another object of the invention is a starting device able to equip a motor vehicle comprising a starter-head assembly intended to drive an output shaft as defined above.

In a variant, the starting device comprises a housing in which there is at least partially mounted the output shaft, the housing comprising an orifice able to have the output shaft pass through it and at least one means of fixing the driving element intended to fix the driving element in an idle position.

The fixing means can comprise for example a washer, or two half washers, or a circlip.

According to one aspect, the invention also concerns a method of assembling a starting device comprising:
- an output shaft comprising a mounting support, a driving element on the mounting support intended to transmit a rotation movement to a thermal engine, and a track attached to the mounting support and intended to transmit a rotation movement to the mounting support,
- a starter-head assembly comprising a freewheel intended to drive the attached track of the output shaft, and
- a housing in which the output shaft is at least partially mounted, the method comprising the following steps:
- securely assembling the attached track on the mounting support,
- assembling the starter-head assembly with the attached track, and
- assembling the attached track, the mounting support and the starter-head assembly at least partially in the housing.

The invention aims in particular to simplify the assembly of a starting device, in particular with regard to the at least partial assembly of the output shaft and the starter-head assembly in the housing.

In a variant embodiment of the invention, the method comprises the following steps:
- securely assembling the attached track on the mounting support,
- assembling the starter-head assembly with the output shaft,
- assembling the output shaft and the starter-head assembly at least partially in the housing.

According to another aspect, the invention concerns a method of assembling a starting device, the starting device comprising:
- an output shaft comprising a mounting support, a driving element attached to the mounting support and intended to transmit a rotation movement to a thermal engine, and a track attached to the mounting support and intended to transmit a rotation movement to the mounting support,
- a starter-head assembly comprising a freewheel intended to drive the attached track of the output shaft, and
- a housing in which the output shaft is at least partially mounted, the method comprising the following steps:
- securely assembling the attached track on the mounting support,
- assembling the starter-head assembly with the attached track,
- assembling the attached track, the mounting support and the starter-head assembly at least partially in the housing, and
- securely assembling the attached driving element on the mounting support so as to form the output shaft.

According to yet another aspect, the invention concerns a method of assembling a starting device, the starting device comprising:
- an output shaft comprising a mounting support, a driving element attached to the mounting support and intended to transmit a rotation movement to a thermal engine, and a track attached to the mounting support and intended to transmit a rotation movement to the mounting support,
- a starter-head assembly comprising a freewheel intended to drive the attached track of the output shaft, and
- a housing in which the output shaft is at least partially mounted, the method comprising the following steps:
- securely assembling the attached track on the mounting support,
- securely assembling the attached driving element on the mounting support so as to form the output shaft,
- assembling the starter-head assembly with the output shaft, and
- assembling the output shaft and the starter-head assembly at least partially in the housing.

This assembly method offers the advantage of being very simple to implement.

According to a particular characteristic of the invention, the housing can comprise an orifice able to have the output shaft pass through it and at least one means of fixing the driving element intended to fix this driving element in an idle position, and the method comprises a supplementary step of assembling the fixing means in the housing. This characteristic makes it possible to fix the driving element very simply on the housing when the output shaft is in an idle position.

BRIEF DESCRIPTION OF THE INVENTION

The invention will be better understood from a reading of the following detailed description, given by way of non-limitative examples of the invention, in which.

DETAILED DESCRIPTION OF PREFERRED EMBODIMENT

Figure 1:
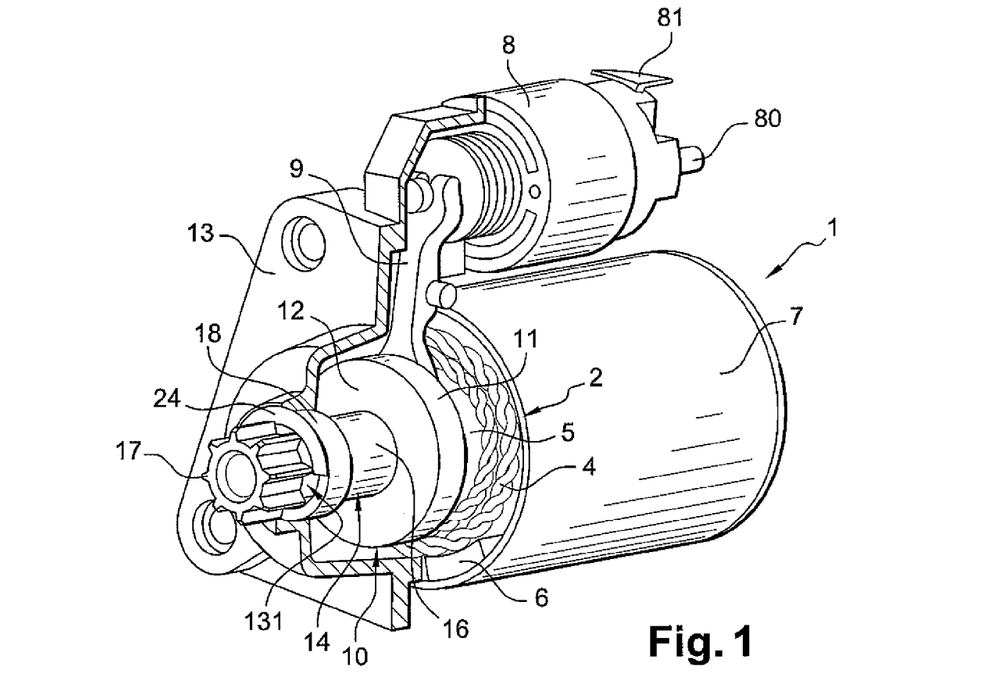
FIG. 1 depicts, in perspective, a starting device comprising an output shaft according to the invention.
Figure 2:
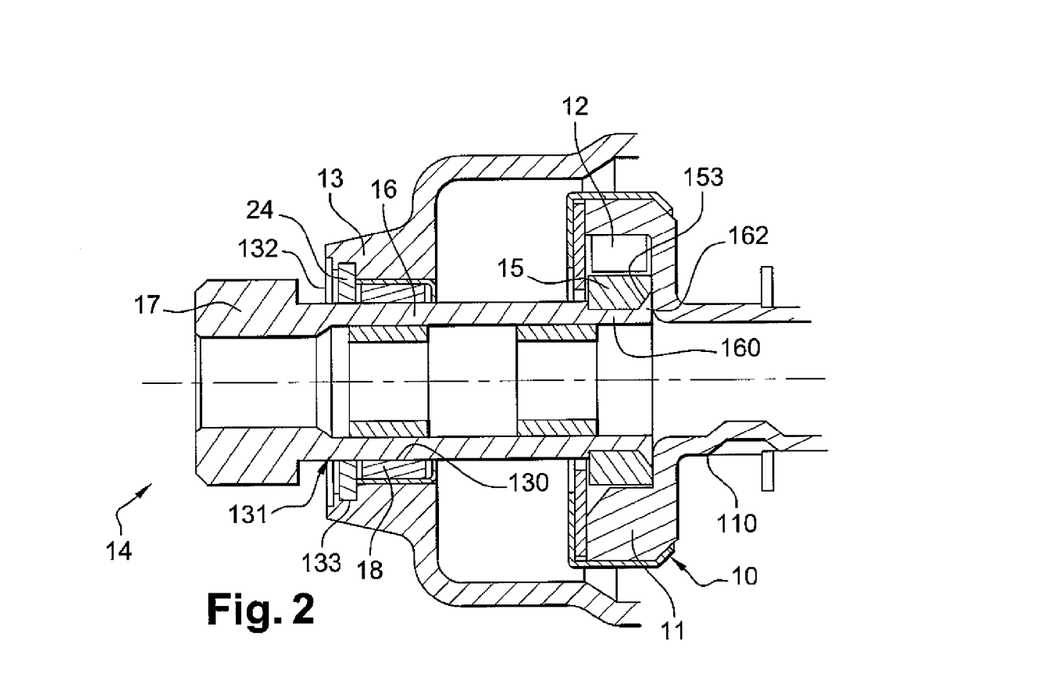
FIG. 2 depicts, in cross section, the starting device of FIG. 1.

FIGS. 1 and 2 describe a starting device 1 comprising an electric motor 2, a contactor 8, a starter-head assembly 10 and an output shaft 14.

The electric motor 2, mounted partially in a casing 7, comprises an armature 4 mounted around a shaft 5, a field winding 6 and electrical contact means (not shown).

When the vehicle ignition key is actuated, or a starting card is introduced, and the contactor 8 closes internal contacts (not shown) the armature 4 is supplied through the electrical contact means, for example brushes, in order to start to rotate. The shaft 5 of the electric motor 2 is intended to set the starter-head assembly 10 in rotation while cooperating with it.

In a variant, a speed reducer may be interposed between the electric motor and the starter-head assembly.

The contactor 8 comprises, in addition to a terminal 80 connected to the brushes, a terminal 81 connected via an electrical connection element, for example a wire, to an electrical supply of the vehicle, in particular a battery (not shown).

At the same time, the contactor 8, when it closes its internal contacts, acts on the starter-head assembly 10 in order to move it axially.

The starter-head assembly 10 comprises a driver 11 and a freewheel 12. The driver 11 is moved axially by a lever 9 of the contactor 8, the latter coming into abutment on a groove 110 in the driver 11.

The lever 9 is produced for example by moulding a plastics material.

The output shaft 14 and the starter-head assembly 10 are moved axially together by the lever 9 of the contactor 8.

In addition, the driver 11 is intended to drive the output shaft 14 by means of the freewheel 12.

The output shaft 14 comprises a mounting support 16, a sleeve 18, an attached track 15 intended to transmit a rotation movement to the mounting support 16, and a driving element 17 intended to transmit a rotation movement to a thermal engine (not shown).

The starter-head assembly 10 and the output shaft 14 are disposed partially in a housing 13.

This housing 13 comprises an orifice 131 through which the output shaft 14 passes.

The socket 18 is mounted on the mounting support 16 and allows an axial movement of the output shaft 14 in an internal wall 130 of the housing 13 and through the orifice 131 in the housing 13.

During the driving phase, the freewheel 12 locks on an external periphery 150 of the attached track 15, which gives rise to high contact forces applied locally to the said external periphery 150. The attached track 15 drives in rotation the mounting support 16, which is secured to the driving element 17. This driving element 17, here formed by a toothed pinion, meshes with a meshing element (not shown), for example a toothed wheel, of the thermal engine.

The pinion 17 during this phase passes from an idle position to a driving position. This driving position is the position in which the output shaft enables the driving element to drive the thermal engine.

In this embodiment, the pinion 17 is in a single piece with the mounting support 16.

In a variant, the output shaft driving element can be formed by a pulley.

The freewheel phase acts when the thermal engine reaches a speed higher than the driving speed of the starting device 1 while the thermal engine and the starting device 1 cooperate mechanically. In this case, the freewheel 12 releases from the attached track 15 of the output shaft 5, in particular by virtue of the phenomenon of centrifugation. Thus the freewheel 12 and the driver 11 of the starter-head assembly 10 no longer cooperate, so as not to drive the shaft 5 of the electric motor 2. However, the output shaft 14 is still in rotation during this phase, and its speed may become very high.

The stop phase occurs when the output shaft 14 has returned to an idle position. The pinion 17, after having disengaged from the ring of the thermal engine, is pulled by the lever 9 until it returns partially in abutment on an external face 132 of the housing 13, in its idle position.

To define this idle position, in particular when the pinion 17 has an outside diameter less than the outside diameter of the sleeve 18, the housing comprises a means of fixing the output shaft 14.

This fixing means comprises here two half washers 24 inserted in a groove 133 in the housing 13 and intended to fix the pinion 17 in the idle position.

In a variant the fixing means may be a washer or a circlip.

Figures 3, 4:
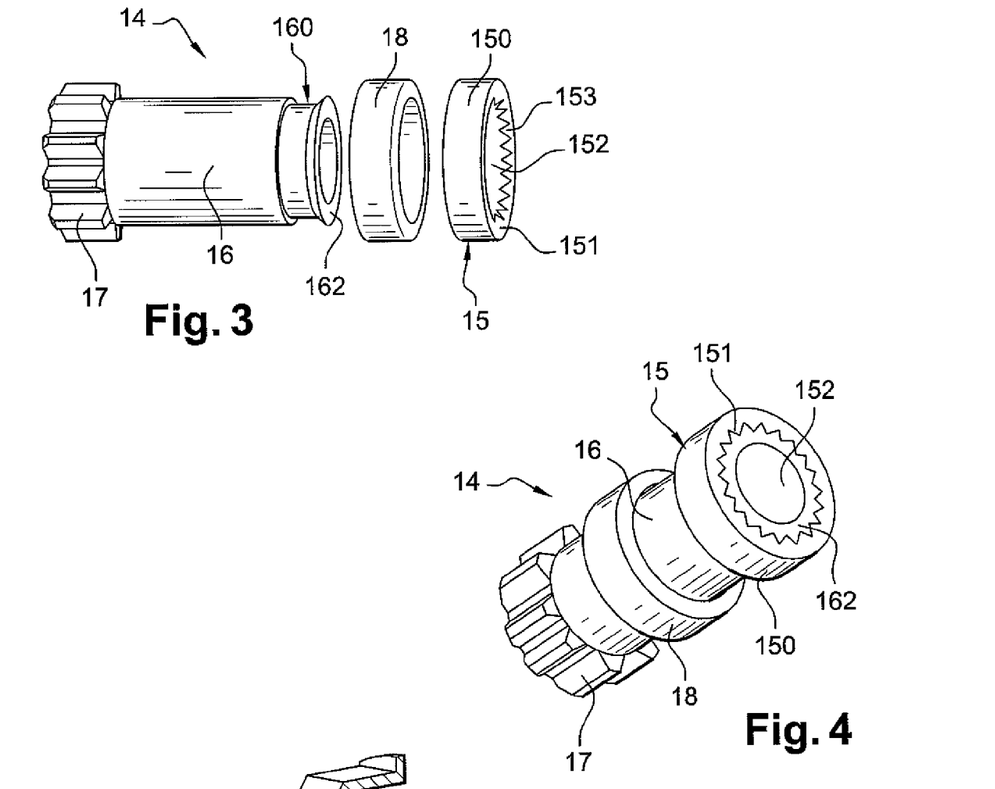
FIG. 3 depicts, in perspective, the output shaft of FIG. 1 in a non-assembled state.
FIG. 4 depicts, in perspective, the output shaft of FIG. 1 in an assembled state.

As shown in FIG. 3, the mounting support 16 comprises, at a rear end 160, a rear portion 162 able to be deformed, this rear portion 162 taking the form of a collar.

In addition, the attached track 15 comprises a material reception indentation 153 for receiving the deformed rear portion 162.

The material reception indentation 153 is produced by stamping at least partially on a rear face 151 and at least partially on an internal periphery 152 of the attached track 15.

As illustrated in FIG. 4, the rear portion 162 situated at the rear end 160 of the mounting support 16 is deformed by crimping.

The attached track 15 is thus assembled on the mounting support 16 and becomes integral with the mounting support 16.

Advantageously, this characteristic makes it possible to adapt the hardness of the metal making up the attached track to the use that is made with the freewheel 12.

Preferably, the attached track 15 will be produced with a material with a high hardness, for example greater than or equal to 750 Hv (Vickers hardness).

Figure 5:
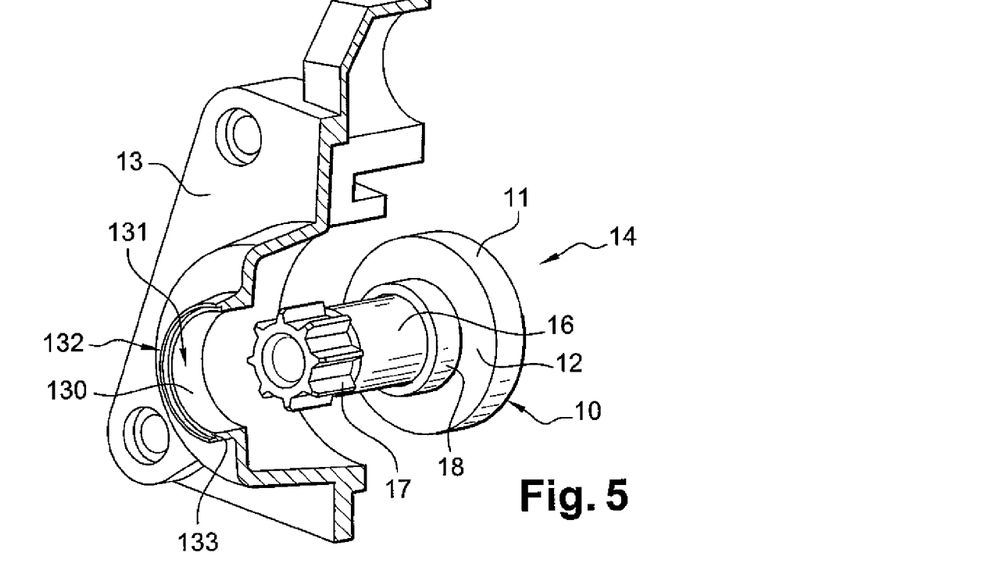
FIGS. 5, 6 and 7 depict, in perspective, the starting device of FIG. 1 in various assembly states.
Figure 6:
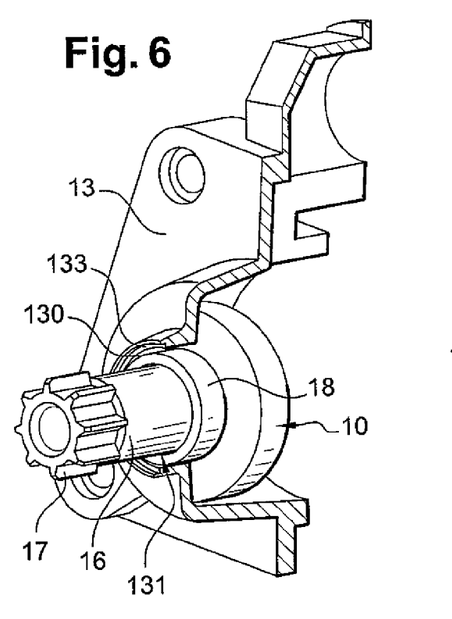
Figure 7:
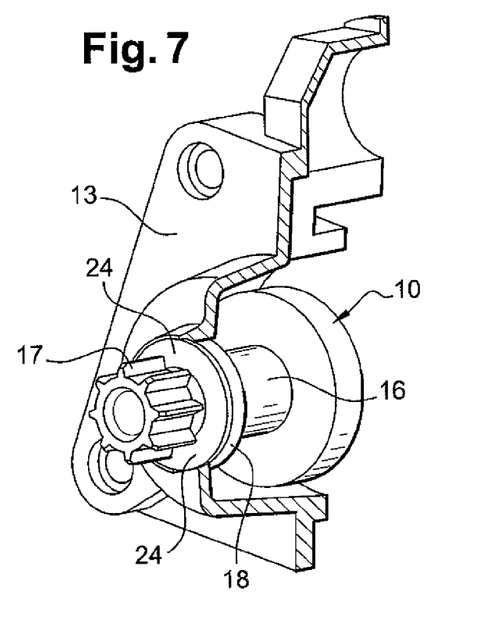

The method of assembling the starting device will now be described with reference to FIGS. 5, 6 and 7.

The sleeve 18 is mounted on mounting support 16, the latter being in a single piece with the pinion 17.

The attached track 15 is assembled by crimping on the mounting support 16 so as to form the output shaft 14.

The starter-head assembly 10 is assembled with the output shaft 14, at the attached track 15.

The outside diameter of the pinion 17 is substantially less than the outside diameter of the sleeve 18.

Thus the output shaft 14 and the starter-head assembly 10 are assembled partially in the housing 13, the pinion 17 passing through the orifice 131 in the housing 13 so as to translationally and rotationally lock the sleeve 18, towards the orifice 131, against the internal wall 130 of the housing 13.

The shape of the sleeve must be adapted to the internal wall of the housing.

Finally, the two half washers 24, intended to fix the pinion 17 in its idle position, are assembled in the groove 133 in the housing 13.

The groove may for example be formed by folding over material of the housing after fitting the fixing means.

In a variant, the groove can be formed by a process of machining the housing.

The assembly method described above offers the advantage of being simple to implement.

In a variant, the starting device, of the cone type, may have no fixing means. This type of starting device may comprise, on the output shaft, a stop means for axially stopping the driving element in a driving position.

Figure 8:
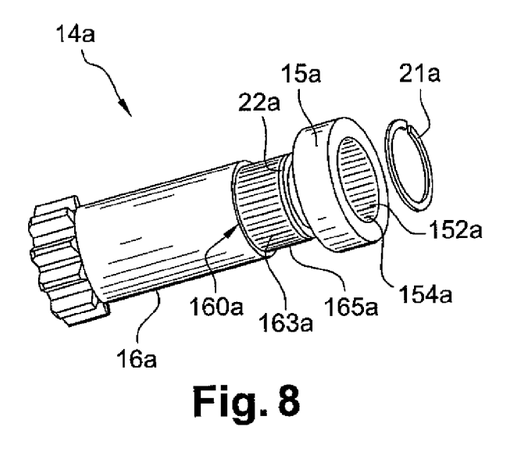
FIGS. 8 and 9 depict, in perspective, an output shaft according to another embodiment of the invention.
Figure 9:
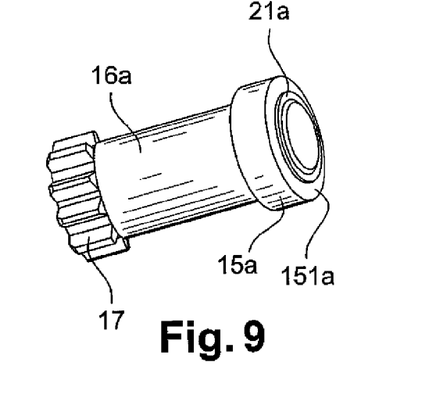

In another embodiment of the invention, as illustrated in FIGS. 8 and 9, the attached track 15a comprises a fluted portion 154a on an internal periphery 152a, and the mounting support 16a comprises, at its rear end 160a, on an external periphery 165a, a fluted rear portion 163a that cooperates with the fluted portion 154a.

In addition, the output shaft 14a comprises a holding element 21a mounted in a groove 22a produced on the external periphery 165a of the mounting support 16a. This holding element 21a allows the translational locking of the attached track 15a on the mounting support 16a.

In this case, the method of assembling the starting device is a identical to the assembly method of the previous embodiment, except that the attached track 15a is not assembled by crimping. This is because the attached track 15a is assembled on the fluted rear portion 163a of the mounting support 16a and the holding element 21a is assembled in the groove 22a of the mounting support 16a so as to come into abutment on the rear face 151a of the attached track 15a.

Figure 10:
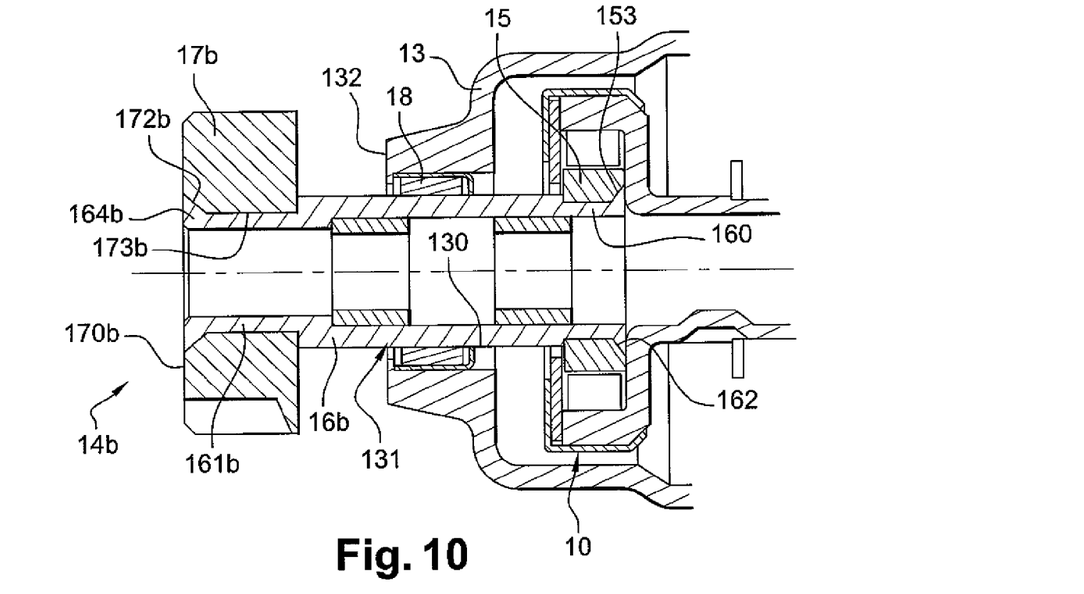
FIG. 10 depicts in cross section a starting device comprising an output shaft according to another embodiment of the invention.

In another embodiment of the invention, as illustrated in FIG. 10, the output shaft 14b comprises an attached driving element 17b and the mounting support 16b comprises, at a front end 161b, a front portion 164b deformed by crimping.

In addition, the attached driving element 17b, here a toothed pinion, comprises a material reception indentation 172b receiving the deformed front portion 164b.

The material reception indentation 172b is produced by stamping at least partially on a front face 170b and at least partially on an internal periphery 173b of the attached driving element 17b.

This embodiment offers the advantage of having an output shaft 14b composed of three elements, each of the elements being able to have a different hardness.

Preferably, the attached track 15 will be produced with a material having a high hardness, for example greater than or equal to 750 Hv, the mounting support 16b will be produced with a material having a hardness less than that of the material making up the attached track 15 and the attached pinion 17b will be produced with a material having intermediate hardness, for example greater than or equal to the hardness of the mounting support 16b but less than the hardness of the attached track 15.

In this embodiment the method of assembling the starting device comprises the step of assembling the attached track 15 on the mounting support 16b.

The sleeve 18 is then mounted on the mounting support 16b.

The outside diameter of the pinion may be greater than the outside diameter of the sleeve 18. This feature enables the attached pinion to have a large number of teeth.

In this case, the starter-head assembly 10 is assembled with the attached track 15, and then the mounting support 16b, the attached track 15, the starter-head assembly 10 and the sleeve 18 are partially assembled in the housing 13, and finally the attached pinion 17b is assembled by crimping on the front end 161b of the mounting support 16b.

In a variant, the outside diameter of the pinion may be substantially less than the outside diameter of the sleeve 18.

In this case the attached pinion 17b is assembled by crimping on the front end 161b of the mounting support 16b so as to form the output shaft 14b, and then the starter-head assembly 10 is assembled with the output shaft 14b, at the attached track 15, and finally the output shaft 14b and the starter-head assembly 10 are assembled at least partially in the housing 13.

Figure 11:
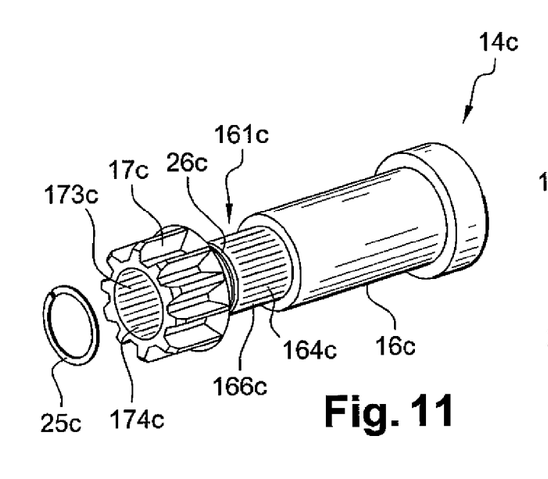
FIGS. 11 and 12 depict, in perspective, an output shaft according to yet another embodiment.
Figure 12:
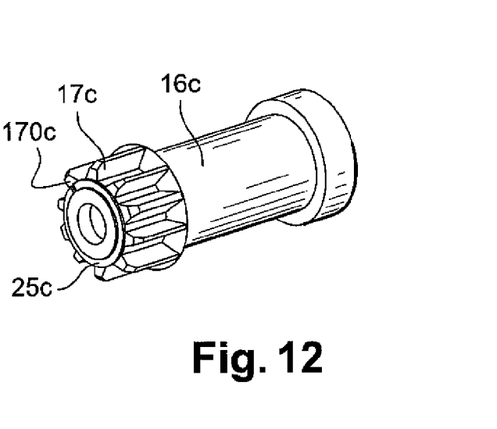

In another embodiment of the invention, as illustrated in FIGS. 11 and 12, the attached pinion 17c comprises a fluted portion 174c on an internal periphery 173c, and the mounting support 16c comprises, at its front end 161c, on an external periphery 166c, a fluted front portion 164c that cooperates with the fluted portion 174c of the attached pinion 17c.

In addition, the output shaft 14c comprises a holding element 25c mounted in a groove 26c on the external periphery 166c of the mounting support 16c. This holding element 25c allows the translational locking of the attached pinion 17c on the mounting support 16c.

In this case, the method of assembling the starting device is identical to the assembly method of the embodiment in FIG. 10, except that the attached pinion 17c is not assembled by crimping. This is because the attached pinion 17c is assembled on the fluted front portion 164c of the mounting support 16c and the holding element 25c is assembled in the groove 26c in the mounting support 16c so as to come into abutment on a front face 170c of the attached pinion 17c.

The invention claimed is:

1. An output shaft of a starting device (1) for a motor vehicle, comprising:
   a mounting support;
   a driving element integrally and non-movably attached to the mounting support for transmitting a rotation movement to a thermal engine; and
   a track integrally and non-movably attached to the mounting support for transmitting a rotation movement to the mounting support, the track being driven by a freewheel (12) of a starter-head assembly of the starting device.

2. The output shaft according to claim 1, wherein the mounting support comprises a rear end and a deformed rear portion (162) at the rear end (160) thereof; and wherein the track comprises a material reception indentation receiving the deformed rear portion, the material reception indentation is at least partially formed on a rear face of the track.

3. Output shaft (14) according to claim 1, wherein the mounting support (16a) comprises a rear end (160a), and wherein the attached track (15a) comprises a fluted portion (154a) and the mounting support (16a) comprises, at its rear end (160a), a fluted rear portion (163a) able to cooperate with the fluted portion (154a) of the attached track (15a), and a holding element (21a) intended to lock the attached track (15a) in translation on the mounting support (16a).

4. The output shaft (14b) according to claim 1, wherein the mounting support (16b) comprises a front end (161b) and a deformed front portion (164b) at the front end (161b) thereof; and wherein the driving element (17b) comprises a material reception indentation (172b) receiving the deformed front portion (164b), the material reception indentation (172b) is at least partially formed on a rear face of the driving element (17b).

5. Output shaft (14b, 14c) according to claim 1, wherein the mounting support (16c) comprises a front end (161c), and wherein the driving element (17c) comprises a fluted portion (174c) and the mounting support (16c) comprises, at its front end (161c), a fluted front portion (164c) able to cooperate with the fluted portion (174*c*) of the driving element (17*c*) and a holding element (25*c*) intended to lock the driving element (17*c*) in translation on the mounting support (16*c*).

6. A starting device (1) for a motor vehicle, comprising a starter-head assembly (10) intended to drive the output shaft (14, 14*a*, 14*b*, 14*c*) according to claim 1.

7. Starting device (1) according to claim 6, comprising:
a housing (13) in which the output shaft (14, 14*a*, 14*b*, 14*c*) is at least partially mounted,
the housing (13) comprising an orifice (1164*b*) able to have the output shaft (14, 14*a*, 14*b*, 14*c*) pass through it,
wherein the housing (13) comprises at least one means (24) of fixing the driving element (17, 17*b*, 17*c*) intended to fix said driving element (17, 17*b*, 17*c*) in an idle position.

8. The output shaft according to claim 1, wherein the track is integrally and non-movably attached and secured to the mounting support by local deformation of material of the mounting support.

9. The output shaft according to claim 8, wherein the mounting support comprises a rear end and a deformed rear portion at the rear end thereof; and wherein the track comprises a material reception indentation receiving the deformed rear portion, the material reception indentation is at least partially formed on a rear face of the track.

10. The output shaft according to claim 9, wherein the track is made of material having hardness greater than hardness of the material of the mounting support.

11. The output shaft according to claim 8, wherein the driving element is integrally and non-movably attached and secured to the mounting support by local deformation of the material of the mounting support.

12. The output shaft according to claim 11, wherein the driving element is made of material having hardness equal or greater than hardness of material of the mounting support.

13. The output shaft according to claim 1, wherein the mounting support comprises a rear end and a deformed rear portion at the rear end thereof;
wherein the track comprises a material reception indentation receiving the deformed rear portion, the material reception indentation is at least partially formed on a rear face of the track;
wherein the driving element is attached and secured to the mounting support by local deformation of the material of the mounting support;
wherein the mounting support comprises a front end and a deformed front portion at the front end thereof; and
wherein the driving element comprises a material reception indentation receiving the deformed front portion, the material reception indentation is at least partially formed on a rear face of the driving element.

* * * * *